US009218693B2

(12) United States Patent
Hale et al.

(10) Patent No.: US 9,218,693 B2
(45) Date of Patent: Dec. 22, 2015

(54) DRIVE SYSTEM POWER MEASUREMENT AND DIAGNOSTIC SYSTEM

(71) Applicant: Bell Helicopter Textron Inc., Fort Worth, TX (US)

(72) Inventors: Keith Hale, Joshua, TX (US); Troy J. Bunch, Jr., Keller, TX (US); James E. Harris, Dalworthington Gardens, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 130 days.

(21) Appl. No.: 13/840,376

(22) Filed: Mar. 15, 2013

(65) Prior Publication Data

US 2014/0277829 A1 Sep. 18, 2014

(51) Int. Cl.
*G07C 5/00* (2006.01)
*G01M 17/00* (2006.01)
*G07C 5/08* (2006.01)

(52) U.S. Cl.
CPC ................ *G07C 5/00* (2013.01); *G07C 5/0825* (2013.01)

(58) Field of Classification Search
CPC ................................ G01M 17/00; G07C 5/00
USPC ........................................................ 701/1, 3
See application file for complete search history.

(56) References Cited

U.S. PATENT DOCUMENTS

2003/0074159 A1* 4/2003 Bechhoefer et al. .......... 702/181
2003/0101801 A1* 6/2003 Wilson et al. ................ 73/54.01
2010/0031756 A1* 2/2010 Mian et al. ....................... 702/41
2010/0219987 A1* 9/2010 Isom et al. .................... 702/183
2012/0303294 A1* 11/2012 Riley et al. ....................... 702/34
2013/0184959 A1* 7/2013 Wendelsdorf et al. ............ 701/1

* cited by examiner

*Primary Examiner* — John Q Nguyen
*Assistant Examiner* — Anshul Sood
(74) *Attorney, Agent, or Firm* — Fish & Richardson P.C.

(57) ABSTRACT

An apparatus comprising a housing, a gearing system disposed within the housing and comprising a plurality of targets, a plurality of sensors incorporated within the housing, a processor in electrical signal communication with the sensors, and a user interface in signal communication with the processor. A method comprising providing a drive system comprising a drive system power measuring and diagnostic system, wherein the drive system is configured to rotate one or more components comprising a plurality of targets, sense the targets with a sensor pair, thereby producing a data signal, process the data signal from the one or more sensor pairs, thereby producing a processed data signal, and output the processed data signal to a user.

20 Claims, 5 Drawing Sheets

DRIVE SYSTEM POWER MEASUREMENT AND DIAGNOSTIC SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In an embodiment, a drive system may be employed in a gearbox, for example, to supply sufficient power and/or lift to a helicopter, an airplane, or tilt rotor. In such embodiments, the drive system is capable of providing high torque to rotate large and/or heavy blades, gears, shafts, bearings, etc. In an embodiment, it may be desirable to measure and/or determine a mass torque, for example, the torque of one or more components of the drive system (e.g., an output shaft). Conventional devices, systems, and methods may employ one or more sensors (e.g., strain gauge) coupled to the rotating mass to determine the torque of the mass as the mass rotates.

Additionally, a drive system may require maintenance over time and may employ conventional diagnostic strategies, such as exception-based and/or periodic checking. In such an embodiments, faults which have developed within the drive system may have to be detected by human experts through physical examination and other off-line tests (e.g., metal wear analysis), for example, during a routine maintenance check-up in order for a corrective action to be taken. Faults that go undetected during a regular maintenance check-up may lead to breakdowns and/or other safety hazards. Conventional devices, systems, and methods may be insufficient to allow such conditions to be reliably detected. As such, it may be desirable to make additional measurements of the performance and integrity of a drive system to improve the overall performance and reliability of the drive system.

SUMMARY

In one aspect, the disclosure includes an apparatus comprising a housing, a gearing system disposed within the housing and comprising a plurality of targets, and a plurality of sensors incorporated within the housing, wherein the sensors are each configured to output an electrical signal in response to sensing the target.

In another aspect, the disclosure includes an apparatus comprising a housing, a gearing system disposed within the housing and comprising a plurality of targets, a plurality of sensors incorporated within the housing, a processor in electrical signal communication with the sensors, and a user interface in signal communication with the processor.

In yet another aspect, the disclosure includes a drive system power measuring and diagnostic method comprising providing a drive system comprising a drive system power measuring and diagnostic system, wherein the drive system is configured to rotate one or more components comprising a plurality of targets, sense the targets with a sensor pair, thereby producing a data signal, process the data signal from the one or more sensor pairs, thereby producing a processed data signal, and output the processed data signal to a user.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
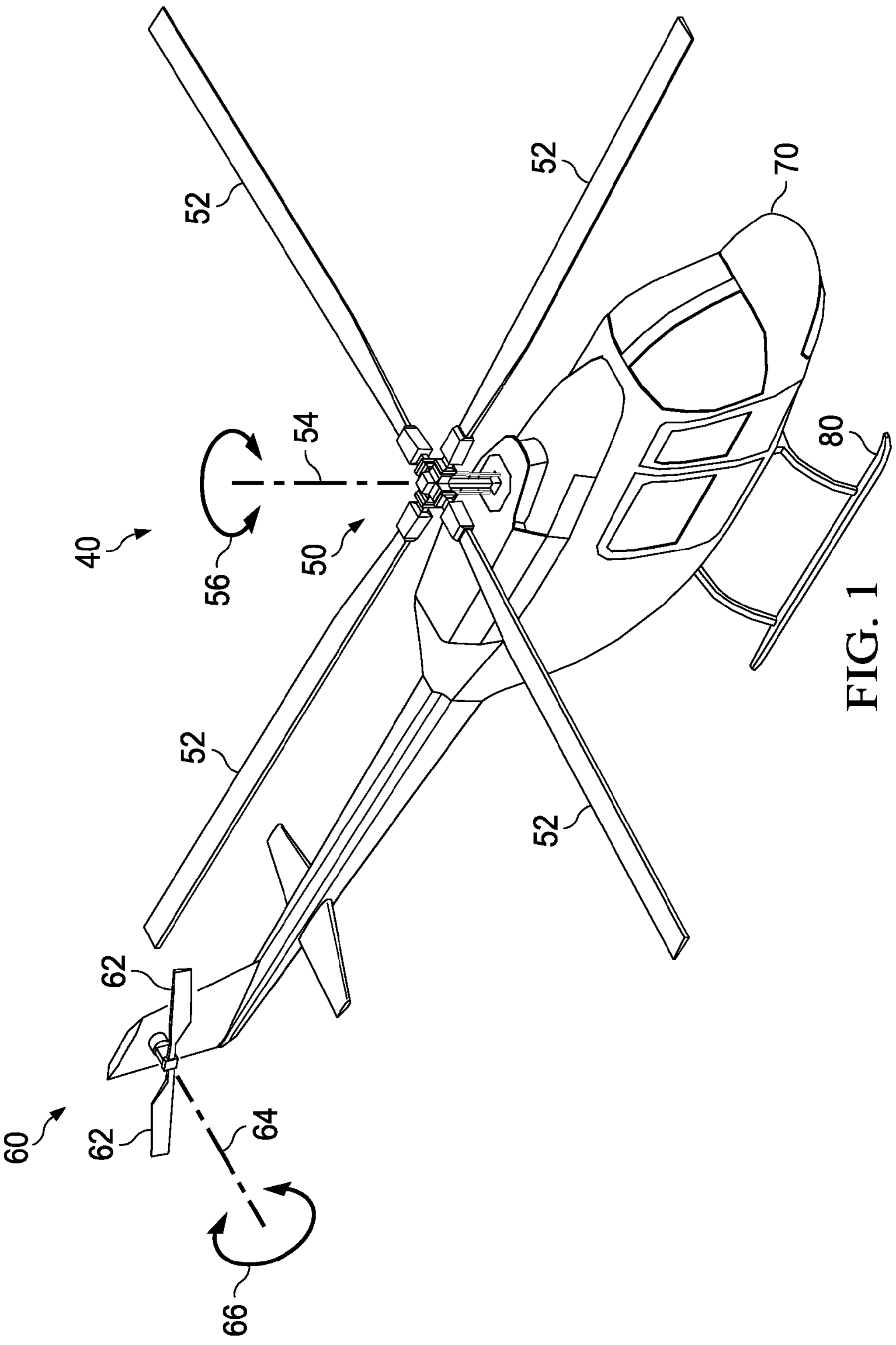
FIG. 1 is a perspective view of an embodiment of a helicopter having a drive system.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results. It should also be recognized that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Unless otherwise specified, use of the terms "connect," "engage," "couple," "attach," or any other like term describing an interaction between elements is not meant to limit the interaction to direct interaction between the elements and may also include indirect interaction between the elements described. In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Disclosed herein are embodiments of a drive system power measurement and diagnostic system (DSPMADS), a drive system comprising a DSPMADS, and methods of using the same. In an embodiment, the DSPMADS may be employed to monitor the performance and integrity of a drive system during operation. For example, the DSPMADS may be used to monitor and/or to prevent events, such as mechanical failures, to increase performance and reliability of a drive system and thereby extend the service-life of the drive system.

FIG. 1 is a perspective view of a helicopter 40. Certain embodiments of the disclosure may be used with a helicopter such as helicopter 40. However, it should be understood that the helicopter example is given merely for illustration purposes only. Embodiments of the present disclosure are not limited to any particular setting or application, and embodiments can be used with a drive system in any setting or application such as other aircrafts, vehicles, or equipment.

In an embodiment, the helicopter 40 includes a main rotor assembly 50, a tail rotor assembly 60, a fuselage 70, and landing gear 80. The main rotor assembly 50 includes two or more blades 52 that are rotated about an axis of rotation 54 in either a clockwise direction or a counterclockwise direction as indicated by arrow 56. The main rotor assembly 50 generates a lift force that supports the weight of helicopter 40 and a thrust force that counteracts aerodynamic drag. Additionally, the main rotor assembly 50 can also be used to induce pitch and roll of the helicopter 40. The tail rotor assembly 60 includes two or more blades 62 that are rotated about an axis of rotation 64 in either a clockwise direction or a counterclockwise direction as indicated by the arrow 66. The tail rotor assembly 60 counters the torque effect created by the main rotor assembly 50 and allows a pilot to control the yaw of the helicopter 40. The fuselage 70 is the main body section the helicopter 40. Optionally, the fuselage 70 holds the crew, passengers, and/or cargo and houses the engine, transmission, gearboxes, drive shafts, control systems, etc. that are needed to establish an operable helicopter. The landing gear 80 is attached to the fuselage 70, supports the helicopter 40 on the ground, and allows it to take off and land.

Figure 2:
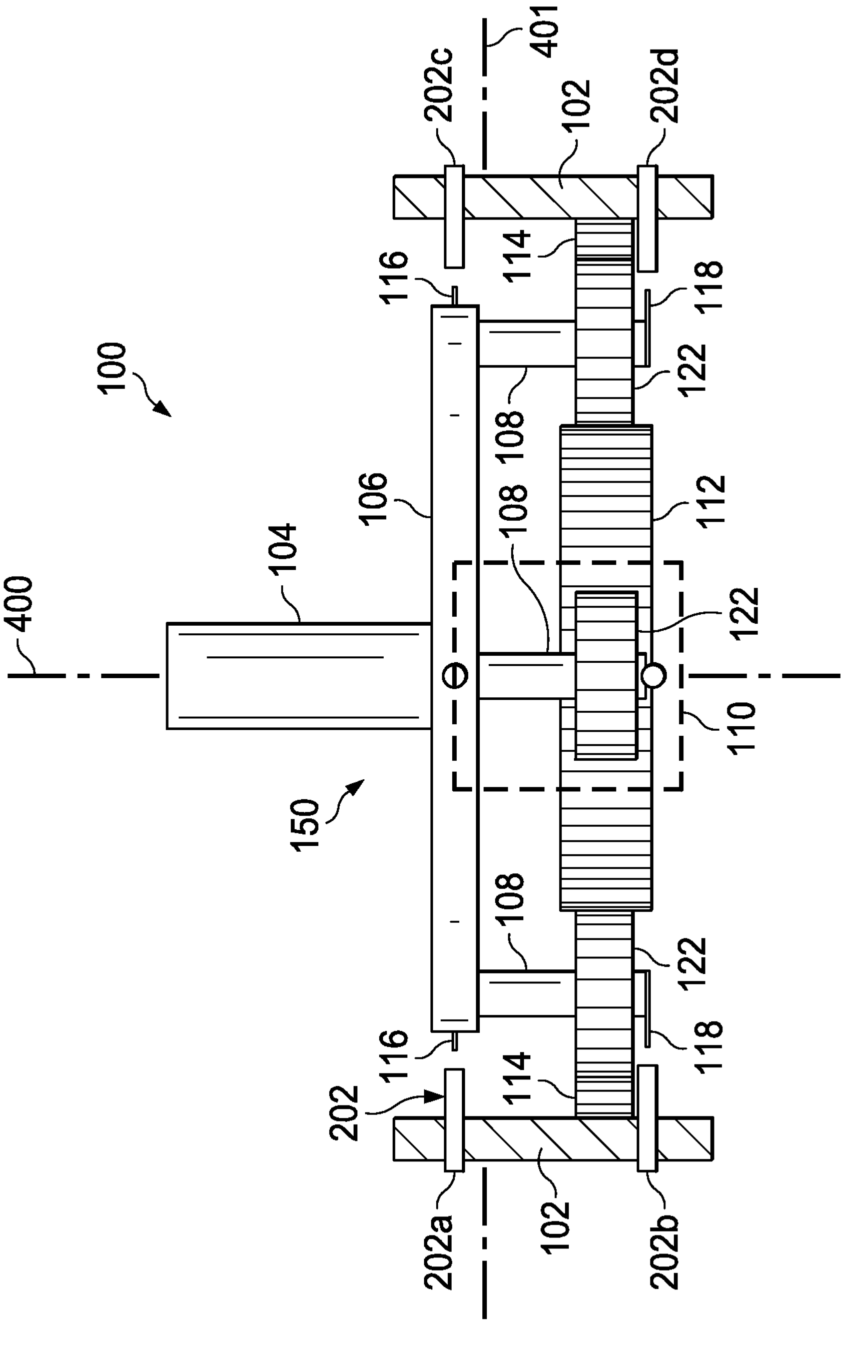
FIG. 2 is a partial cut-away view of an embodiment of a drive system.

Referring to FIG. 2, an embodiment of an operating environment of a DSPMADS is illustrated. The operating environment generally comprises a drive system 100 comprising of a housing 102 and a gearing system 150. In an embodiment, the housing 102 may be generally configured to cover and/or to protect the components of the drive system 100. The housing 102 may be a gearbox or transmission for a rotor system, propeller, or proprotor system, or any other mechanical system. The housing 102 may be formed of iron, steel, aluminum, an aluminum alloy, a ceramic, a composite material, any other suitable material as would be appreciated by one of ordinary skill in the art upon viewing this disclosure, or combination thereof. Additionally, the housing 102 may comprise a unitary structure; alternatively, the housing 102 may be made up of two or more operably connected components, which may be joined via a suitable connection, such as a welded or threaded connection. Alternatively, the housing 102 may comprise any suitable structure as will be appreciated by one of ordinary skill in the art with the aid of this disclosure.

In an embodiment, the gearing system 150 may be configured to accept an input torque (e.g., a rotational force applied to a carrier) and to produce a range of output speeds and/or torque ratios to drive an output shaft. The gearing system 150 may generally comprise an epicyclic gearing or planetary gearing system, such as those known in the art and as would be appreciated by one of ordinary skill in the art. Referring to the embodiment of FIG. 2, the gearing system 150 may generally comprise a ring gear 114, a plurality of planet gears 122, a sun gear 112, a planet assembly 110, an output shaft 104, a carrier 106, and a plurality of posts 108.

The ring gear 114 may be disposed within the interior of the housing 102 in a fixed position with respect to the housing 102. Additionally, the ring gear 114 comprises a plurality of teeth (e.g., gear teeth) disposed about an inner circumference of the ring gear 114. The carrier 106 may be coupled to the plurality of planet gears 122 via the plurality of posts 108 (e.g. planet pinion shafts). In such an embodiment, the planet gears 122 may be radially distributed about the carrier 106. Additionally, each of the planet gears 122 may comprise a plurality of teeth (e.g., gear teeth) disposed radially about the circumference of the planet gears 122 and may be configured such that at least a portion of the planet gears 122 engages and/or contacts the ring gear 114, for example, via an engagement between the gear teeth of the planet gears 122 and the gear teeth of the ring gear 114. The planet gears 122 may each be configured to rotate radially about a longitudinal axis of the posts 108. The sun gear 112 may be disposed in a centralized position with respect to the planet gears 122, for example, the sun gear 112 may be configured to be radially encircled by the planet gears 122. Additionally, the sun gear 112 may comprise a plurality of teeth (e.g., gear teeth) disposed radially about the circumference of the sun gear 112 and may be configured to at least partially engage and/or contact the planet gears 122, for example, via an engagement between the gear teeth of the planet gears 122 and the gear teeth of the sun gear 112. The planet assembly 110 may be configured to be coupled and/or engaged with the sun gear 112. For example, the planet assembly 110 may be configured in a radial position with respect to the sun gear 112 such that a rotational force experienced by the sun gear 112 is also experienced by the planet assembly 110 though engagement of planet gear 122 with sun gear 112 and ring gear 114. In an embodiment, the planet assembly 110 may be configured to be coupled to the output shaft 104 via the post 108. In such an embodiment, the gearing system 150 may be configured such that a rotational force experienced by the planet assembly 110 is transferred to the output shaft 104 via the post 108. In an alternative embodiment, any suitable gearing system may be employed as would be appreciated by one of ordinary skill in the art upon viewing this disclosure.

In an embodiment, the drive system 100 comprises one or more targets (e.g., a carrier target, a post target, etc.). For example, two sensors may be located at the same azimuthal position, but at different longitudinal positions relative to the axis of rotation. In an additional example, the carrier 106 may further comprise one or more targets (e.g., one or more carrier targets 116 disposed radially about the circumference of the carrier 106). Further, one or more of the posts 108 may further comprise a target (e.g., a post target 118). For example, in the embodiment of FIG. 2, the post target 118 may be disposed about a lower terminal portion of the posts 108. The target (e.g., the carrier target 116 and/or the post target 118) may be made of a ferromagnetic material (e.g., a material susceptible to a magnetic field), such as, iron, cobalt, nickel, steel, rare-earth metal alloys, ceramic magnets, nickel-iron alloys, rare-earth magnets (e.g., a neodymium magnet, a samarium-cobalt magnet), other known materials such as CO-NETIC AA®, MUMETAL®, HIPERNON®, HY-MU-80®, PERMALLOY® (which all may comprise about 80% nickel, 15% iron, with the balance being copper, molybdenum, chromium), any other suitable material as would be appreciated by one of ordinary skill in the art upon viewing this disclosure, or combinations thereof. In an additional or alternative embodiment, the target (e.g., the carrier target 116 and/or the post target 118) may comprise a magnet, for example, a ceramic magnet, or a rare-earth magnet (e.g., a neodymium magnet or a samarium-cobalt magnet). Additionally, the carrier target 116 and/or the post target 118 may comprise a surface having a magnetic north-pole polarity and a surface having a magnetic south-pole polarity and may be configured to generate a magnetic field.

In an embodiment, the sensors 202 (e.g., sensors 202*a*-202*e*) may be electrically connected to the processor 204, for example, via electrical connections 250*a*-250*e*, respectively. In their simplest form, each sensor 202 may detect the passing of the target (e.g., the carrier target 116 and/or the post target 118). As such, the sensors 202 (e.g., sensors 202*a*-202*e*) may comprise any suitable type and/or configuration of apparatus capable of detecting a mass, motion of a mass, and/or rotational speed of a mass. Suitable detection sensors may include, but are not limited to, a proximity sensor, a laser, an optical sensor, an eddy current sensor, a contact sensor, a reed switch sensor, any other technical readiness level (TRL)-9 sensor, or the like. Additionally, the sensors 202 may be suitable to employ in hot-oil environments, for example, with oil temperatures around 350° F.

In an additional or alternative embodiment, the sensors 202 may comprise any suitable type and/or configuration of apparatus capable of detecting a magnetic field (e.g., ferromagnetic debris, a ferromagnetic material or mass, etc.) and/or a change in a magnetic field (e.g., a magnetic field variation caused by a moving ferromagnetic material or mass, for example, a carrier target, a post target, etc.) within a given predetermined proximity of the sensors 202. Suitable magnetic sensors may include, but are not limited to, a variable reluctance (VR) sensor, an inductive magnetic sensor, a magneto-resistive sensor, a giant magneto-resistive (GMR) sensor, a microelectromechanical systems (MEMS) sensor, a Hall-effect sensor, a conductive coil sensor, a super conductive quantum interference device (SQUID) sensor, or the like. The sensors 202 may be passive sensors, for example, the sensors 202 may not require an external power source. In an additional or alternative embodiment, the sensors 202 may be configured to be combined with one or more permanent magnets, for example, to generate and/or enhance (e.g., increase) a magnetic field that may be disturbed by a ferromagnetic mass (e.g., a carrier target 116, a post target 118, etc.). The sensors 202 may be configured to output a suitable indication of a detected magnetic field and/or a change in a magnetic field. For example, the sensors 202 may be configured to convert a magnetic field and/or a change in a magnetic field to a suitable electrical signal (e.g., a data signal). A suitable electrical signal may comprise a varying analog voltage or current signal representative of a magnetic field and/or a change in a magnetic field experienced by the sensors 202. In an alternative embodiment, the suitable electrical signal may comprise a digital voltage signal in response to a magnetic field and/or a change in a magnetic field experienced by the sensors 202.

Referring to the embodiment of FIG. 2, one or more sensors 202 (e.g., sensors 202*a*-202*d*) may be incorporated and/or integrated with the housing 102. For example, the first sensor 202*a* and the third sensor 202*c* may be incorporated within the housing 102 and positioned proximate and/or adjacent to the carrier 106 and/or one or more carrier targets 116. Additionally, the second sensor 202*b* and the fourth sensor 202*d* may be incorporated within the housing 102 and positioned proximate and/or adjacent to one or more posts 108 (e.g., a lower terminal portion or an upper terminal portion of the posts 108) and/or one or more post targets 118. In an embodiment, the sensors 202 may be configured such that the distance between one or more sensors 202 (e.g., sensors 202*a*-202*d*) and one or more targets (e.g., the carrier target 116 and/or the post target 118) is less than a maximum gap distance, thereby allowing the one or more sensors 202 to sense a target (e.g., the carrier target 116 and/or the post target 118) and/or a change in a magnetic field. Additionally, the sensors 202 may be configured to provided position and/or orientation information of one or more components (e.g., one or more posts 108, etc.) of the drive system 100, as will be disclosed herein.

In an embodiment, the DSPMADS 200 may comprise a plurality of functional units. In an embodiment, a functional unit (e.g., an integrated circuit (IC)) may perform a single function, for example, serving as an amplifier or a buffer. Additionally or alternatively, in an embodiment, the functional unit may perform multiple functions on a single chip. In an embodiment, the functional unit may comprise a group of components (e.g., transistors, resistors, capacitors, diodes, and/or inductors) on an IC which may perform a defined function. The functional unit may comprise a specific set of inputs, a specific set of outputs, and an interface (e.g., an electrical interface, a logic interface, and/or other interfaces) with other functional units of the IC and/or with external components. In some embodiments, the functional unit may comprise repeat instances of a single function (e.g., multiple flip-flops or adders on a single chip) or may comprise two or more different types of functional units which may together provide the functional unit with its overall functionality. For example, a microprocessor may comprise functional units such as an arithmetic logic unit (ALU), one or more floating-point units (FPU), one or more load or store units, one or more branch prediction units, one or more memory controllers, and other such modules. In some embodiments, the functional unit may be further subdivided into component functional units. For example, a microprocessor as a whole may be viewed as a functional unit of an IC, for example, if the microprocessor shares a circuit with at least one other functional unit (e.g., a cache memory unit).

The functional unit may comprise, for example, a general purpose processor, a mathematical processor, a state machine, a digital signal processor, a video processor, an audio processor, a logic unit, a logic element, a multiplexer, a demultiplexer, a switching unit, a switching element an input/output (I/O) element, a peripheral controller, a bus, a bus controller, a register, a combinatorial logic element, a storage unit, a programmable logic device, a memory unit, a neural network, a sensing circuit, a control circuit, a digital to analog converter (DAC), an analog to digital converter (ADC), an oscillator, a memory, a filter, an amplifier, a mixer, a modulator, a demodulator, and/or any other suitable devices as would be appreciated by one of ordinary skill in the art upon viewing this disclosure.

Figure 3:
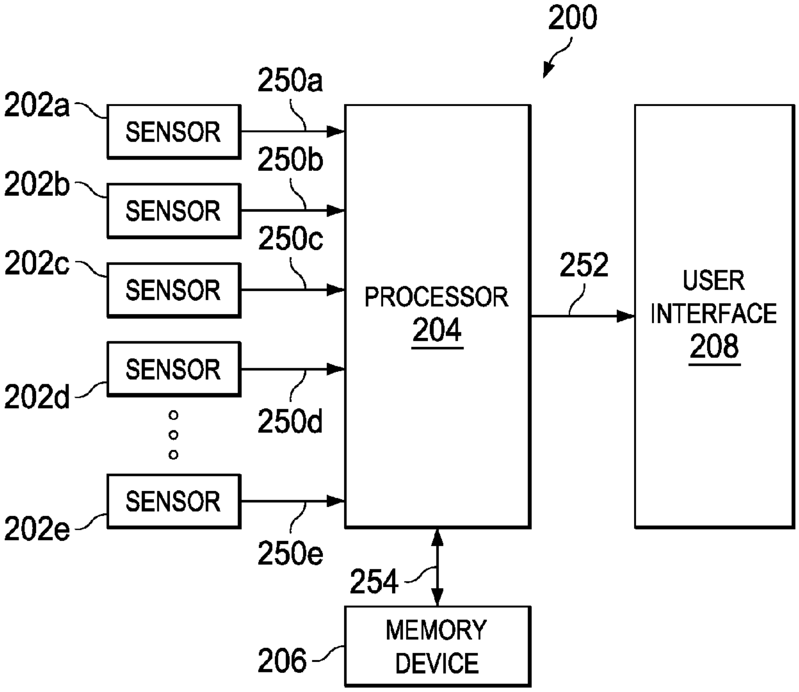
FIG. 3 is a schematic diagram of an embodiment of a drive system power measuring and diagnostic system.

In the embodiment of FIG. 3, the DSPMADS 200 may comprise a plurality of distributed components and/or functional units and each functional unit may communicate via a suitable signal conduit, for example, via one or more electrical connections, as will be disclosed herein.

Additionally, the DSPMADS 200 may generally comprise one or more sensors (e.g., a first sensor 202*a, a* second sensor 202*b, a* third sensor 202*c, a* fourth sensor 202*d*, and a fifth sensor 202*e*; cumulatively and non-specifically, sensors 202), a processor 204, user interface 208, and a memory device 206. In an embodiment, the DSPMADS 200 may comprise two or more sensors 202, for example, the DSPMADS 200 may comprise 2, 3, 4, 5, 6, 7, 8, 9, 10, 11, or more sensors 202. Thus, it should be understood that the scope of this disclosure is not limited to any particular positioning or number of sensors 202. The two or more sensors may work in conjunction with each other. For example, the DSPMADS 200 may be configured to employ one or more sensor pairs. Referring to FIG. 2, the first sensor 202*a* and the second sensor 202*b* may form a first sensor pair and the third sensor 202*c* and the fourth sensor 202*d* may form a second sensor pair. In an embodiment, the DSPMADS 200 may comprise 1, 2, 3, 4, 5, 6, 7, 8, 9, 10, 11, or any other suitable number of sensor pairs as would be appreciated by one of ordinary skill in the art upon viewing this disclosure.

In an embodiment, the DSPMADS 200 may comprise a single sensor pair 202. For example, the first sensor 202*a* and the second sensor 202*b* may be located at the same azimuthal position, but a different longitudinal position relative to the axis of rotation (e.g., with respect to the longitudinal axis 400). In such an embodiment, the sensor pair 202 may be configured and/or employed to detect temperature, lateral bending, rotational speed, torque, and/or ferromagnetic debris of one or more components of the drive system 100. For example, the sensor pair 202 may detect a lateral bending of a post 108. In an alternative embodiment, the DSPMADS 200 may comprise two sensor pairs 202. For example, the DSPMADS 200 may comprise a first sensor pair and a second sensor pair positioned about 180 degrees apart from each other about the longitudinal axis 400 of the drive system 100. In such an embodiment, the two sensor pairs 202 may be configured and/or employed to detect temperature, ferromagnetic debris, lateral bending, rotational speed, rotation radius, oscillatory motion, torque, and/or misalignment of one or more components of the drive system 100 along a lateral axis (e.g., a lateral axis 401 as shown in FIG. 2). For example, two sensor pairs 202 may detect a loss of lubrication situation, for example, via thermal growth and/or a change in a magnetic field strength. In an alternative embodiment, the DSPMADS 200 may comprise three sensor pairs 202. For example, the DSPMADS 200 may comprise a first sensor pair, a second sensor pair, and a third sensor pair positioned about 120 degrees apart from each other about the longitudinal axis 400 of the drive system 100. In an alternative embodiment, the DSPMADS 200 may comprise four or more sensor pairs 202. For example, the DSPMADS 200 may comprise a first sensor pair, a second sensor pair, a third sensor pair, and a fourth sensor pair positioned about 90 degrees apart from each other about the longitudinal axis 400 of the drive system 100. In such an embodiment, the four sensor pairs 202 may be configured and/or employed to detect temperature, ferromagnetic debris, lateral bending, rotational speed, rotation radius, oscillatory motion, torque, and/or misalignment of one or more components of the drive system 100 with respect to a first lateral axis and a second lateral axis. For example, the second lateral axis may be about a 90-degree rotation from the first lateral axis about the longitudinal axis 400.

Referring to FIG. 3, in an embodiment the processor 204 may be electrically connected to and/or in electrical signal communication with the user interface 208 (e.g., via an electrical connection 252) and to the memory device 206 (e.g., via an electrical connection 254). In an embodiment, the processor 204 may be configured to sample an electrical signal (e.g., a data signal from the sensors 202) at a suitable rate. For example, the processor 204 sample rate may be about 1 Hertz (Hz), 10 Hz, 100 Hz, 1 kilohertz (kHz), 10 kHz, 100 kHz, 1 megahertz (MHz), or alternatively any suitable sample rate as would be appreciated by one of ordinary skill in the art upon viewing this disclosure.

Additionally, the processor 204 may be configured to perform one or more processes (e.g., analysis, numerical computation, etc.) on the data signals (e.g., the data signal from one or more sensors 202) and thereby produce a processed data signal. In such an embodiment, one or more processes may be performed in software, hardware, or a combination of software and hardware. Additionally, the processor 204 may be configured to control the flow of data through the DSPMADS 200 and/or coordinate the activities of one or more functional units of the DSPMADS 200. For example, the processor 204 may be configured to be coupled with and/or to control data transmission between the sensors 202, the user interface 208, the memory device 206, and/or any other functional units of the DSPMADS 200. In an additional or alternative embodiment, the processor 204 may further comprise a digital signal processor (DSP) and may be configured to manipulate, to modify, and/or to improve (e.g., buffer) a digital data signal, for example, a digital data signal from the sensors 202, and thereby produce a processed data signal.

In an embodiment, the user interface 208 may be generally configured to provide information or data (e.g., rotational speed, torque, temperature, etc.) to one or more operators (e.g., the flight crew, etc.). For example, the user interface 208 may comprise one or more electrical gauges, one or more mechanical gauges, and/or one or more electromechanical gauges, displays, or the like. For example, the DSPMADS 200 may comprise one or more electromechanical gauges and may interface one or more of the electromechanical gauges with the processor 204 via the electrical connection 252.

In an embodiment, the memory device 206 may be generally configured to store information (e.g., a data signal) for the processor 204 and/or the DSPMADS 200. In such an embodiment, the processor 204 may be configured to read and/or to write data to one or more memory cells of the memory device 206. In an embodiment, the memory device 206 may comprise a read only memory (ROM), a random access memory (RAM), a flash memory, an external memory (e.g., a secure digital (SD) card), any suitable type of memory device as would be appreciated by one of ordinary skill in the art upon viewing this disclosure, or combinations thereof.

Figure 4:
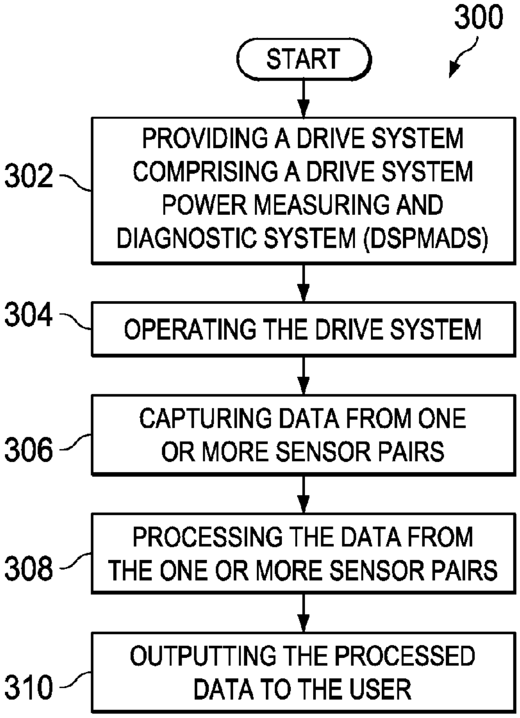
FIG. 4 is a flowchart of an embodiment of a drive system power measuring and diagnostic method.

In an embodiment, a drive system power measuring and diagnostic method utilizing a DSPMADS and/or a system comprising a DSPMADS is disclosed herein. As illustrated in FIG. 4, a drive system power measuring and diagnostic method 300 may generally comprise the steps of providing a drive system comprising a DSPMADS 302, operating the drive system 304, capturing data from one or more sensor pairs 306, processing the data from the one or more sensor pairs 308, and outputting the processed data to a user 310.

Figure 5:
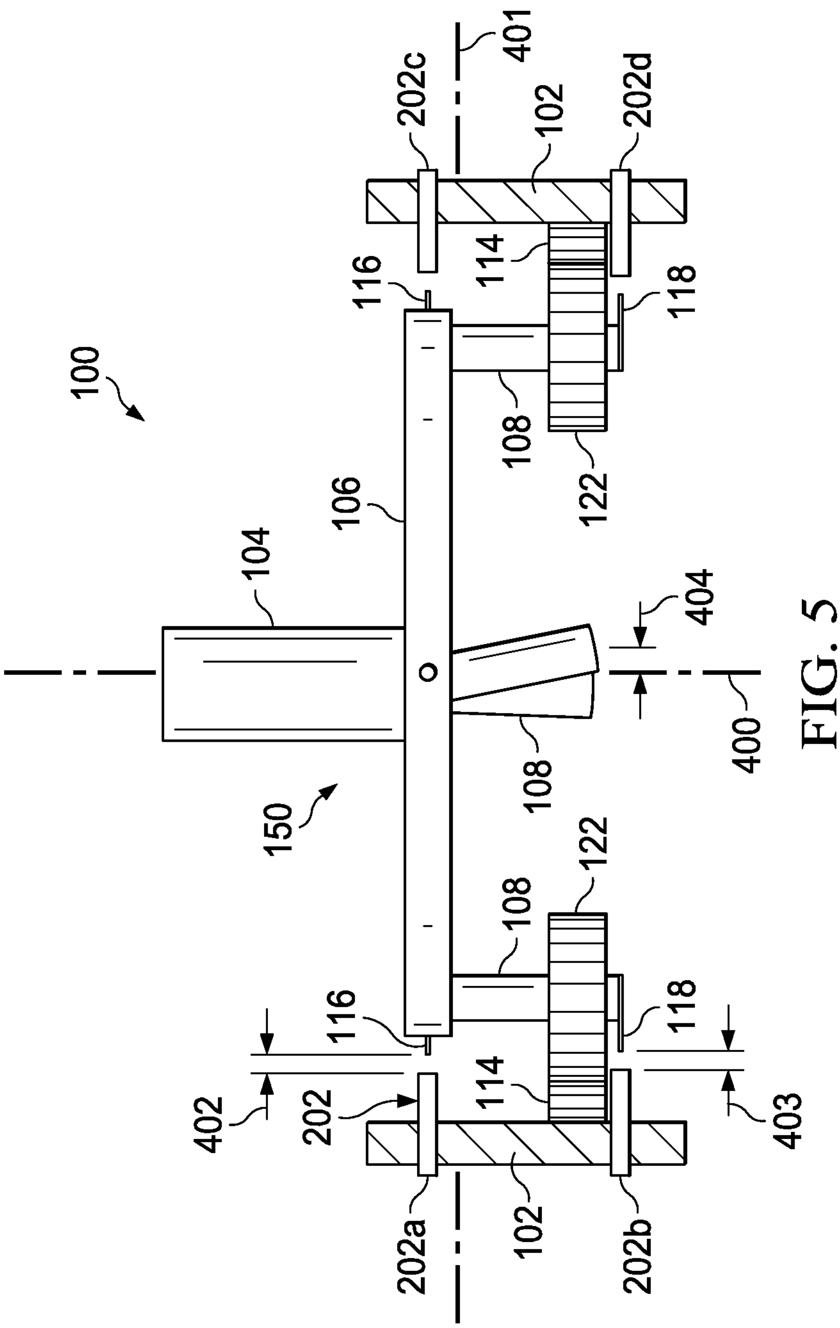
FIG. 5 is a partial cut-away view of an embodiment of a drive system in operation.

Referring to FIG. 5, a drive system 100 comprising a DSPMADS 200 may be provided. For example, a drive system 100 comprising a DSPMADS 200 may be designed similar to that described herein, manufactured, and incorporated and/or integrated with an aircraft (e.g., a helicopter, a tilt rotor, an airplane, etc.). Providing a drive system 100 comprising a DSPMADS 200 may further comprise configuring and/or calibrating the drive system 100 and/or the DSPMADS 200. For example, the drive system 100 may be operated to develop a baseline reading from which abnormalities can be detected (e.g., temperature, ferromagnetic debris, lateral bending, rotational speed, rotation radius, oscillatory motion, torque, misalignment of one or more components of the drive system 100 with respect to a first lateral axis and a second lateral axis, etc.).

In an embodiment, the drive system 100 may be coupled to an engine, a crankshaft, a gear box, a transmission, or any other suitable apparatus configured to provide a rotational force (e.g., to a rotor, gears, shafts, bearings, etc.) as would be appreciated by one ordinary skill in the art upon viewing this disclosure. In an embodiment, the drive system 100 may be employed and/or operated to apply and/or to transfer a rotational force to a rotor or a rotor system, for example, for rotating a bladed rotor propeller, or proprotor.

In an embodiment, each of the sensors 202 (e.g., sensors 202*a*-202*d*) senses one or more targets and outputs an electrical signal indicative of the position and/or orientation of one or more components (e.g., the output shaft 104, the carrier 106, the posts 108, etc.) of the drive system 100. Referring to the embodiment of FIG. 5, as the drive system 100 rotates about the longitudinal axis 400, the first sensor 202*a* and/or the third sensor 202*c* may experience or detect the motion and/or position of the carrier 106, for example, via one or more carrier targets 116. For example, the first sensor 202*a* may sense and/or detect the position of the carrier 106 and/or an upper portion of one or more posts 108 with respect to first sensor 202*a*, for example, a first gap distance 402. In an embodiment, the gap distance may be filled with a liquid (e.g., oil), air, or combinations thereof. Additionally, the second sensor 202*b* and/or the fourth sensor 202*d* may experience or detect the motion and/or position of one or more posts 108, for example, via one or more post targets 118. For example, the second sensor 202*b* may sense and/or detect the position of one or more planet gears 122 and/or a lower portion of one or more posts 108 with respect to the second sensor 202*b*, for example, a second gap 403. In an embodiment, any suitable number and/or configuration of sensors 202 or sensor pairs 202 may be employed to sense and/or to detect the motion and/or position of components within the drive system 100, as would be appreciated by one of ordinary skill in the art upon viewing this disclosure.

In an additional or alternative embodiment, one or more sensors 202 may sense a rotational speed of one or more components (e.g., the output shaft 104, the carrier 106, etc.) of the drive system 100. In an additional or alternative embodiment, one or more sensors 202 may output a data signal in response to the detection of ferromagnetic debris within the drive system 100. For example, the one or more sensors 202 (e.g., a VR sensor, a magnetic pickup, etc.) may output a data signal to the processor 204 in response to a change in a magnetic field caused by ferromagnetic debris. Conventional systems may employ a metallic chip detector (which may comprise a magnet) positioned within the housing 102 to capture ferromagnetic debris and detect any wear of the gearbox components. Generally, helicopter designers and manufacturers do not want to put other magnetic components in the gearbox because the additional ferromagnetic component would attract metallic components and decrease the effectiveness of the metal chip detector. Thus, it is counterintuitive to employ magnetic sensors in a gearbox comprising a metallic chip detector. However, the inventors have found that when sized appropriately, the magnetic sensors described herein are sufficiently strong to attract magnetic debris, but the processor 204 can determine when ferromagnetic debris attaches to the magnetic sensors. Thus, the magnetic sensors in the gearbox can also function as either primary or backup chip detectors.

In an embodiment, the processor 204 may receive an electrical signal (e.g., a data signal) from one or more sensors 202 or pairs of sensors 202 and may perform one or more analytical and/or computational processes on the data signal and thereby produce a processed data signal. For example, the processor 204 may measure and/or calculate output shaft torque, output shaft bending, post bending, output shaft rotational speed, sensor temperature, rotational component radius, rotational component temperature, rotating component rotational oscillatory motion, rotating component radial oscillatory motion, ferromagnetic debris detection, any other suitable process as would be appreciated by one of ordinary skill in the art upon viewing this disclosure, or combination thereof to produce the processed data signal.

Determining the temperature within a gearbox using the sensors 202 described herein is not the normal use for the sensors 202, and thus some additional explanation is provided. Although the processor 204 may be configured to measure the gap between the sensor 202 and the target when the target passes the sensor and/or the time between successive passes of the target (e.g. to measure speed), the processor 204 may also examine the form (e.g. frequency response) of the signal from a sensor 202 (e.g. a VR sensor) as a target passes. The frequency response can be mapped at various fluid temperatures and speeds to determine a baseline frequency response. When subsequently operating the gearbox, the actual frequency response and gear speed can then be used to determine the temperature of the fluid within the gearbox.

Referring to FIG. 5, the processor 204 may receive a data signal from a sensor pair (e.g., the first sensor 202*a* and the second sensor 202*b*) and may compare the timing of the target 116 passing the first sensor 202*a*, as sensed by the first sensor 202*a*, to the timing of the target 118 passing the second sensor 202*b*, as sensed by the second sensor 202*b*, to detect and/or measure bending or deformation of one or more posts 108, for example, a bending distance 404. The processor 204 may employ the bending or deformation of one or more posts 108 in a numerical calculation to determine the torque of one or more components of the drive system 100. Any suitable numerical process for calculating or determining torque may be employed as would be appreciated by one of ordinary skill in the art upon viewing this disclosure. In an additional or alternative embodiment, the processor 204 may employ and/or compare a plurality of sensor pair timings to detect and/or measure the motion and/or offset of the one or more components with respect to a first lateral axis (e.g., a first offset distance 411 for the output shaft 104 measured with respect to the first lateral axis 401) and/or a second lateral axis (e.g., a second offset distance 406 for the output shaft 104 and a third offset distance 410 for the carrier 106, both measured with respect to a second lateral axis 405).

Figure 6:
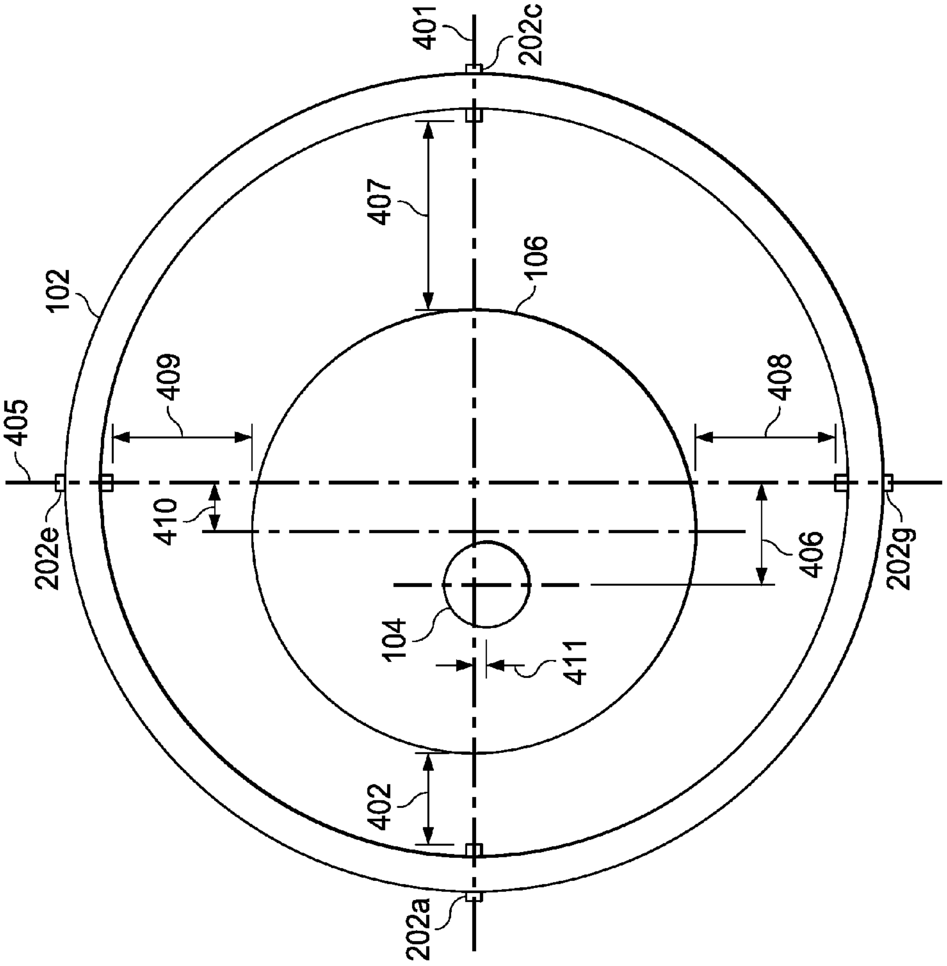
FIG. 6 is a top view of an embodiment of a drive system in operation.

In the embodiment of FIG. 6, the processor 204 may receive a data signal from the sensors 202 (e.g., the first sensor 202*a*, the third sensor 202*c*, the fifth sensor 202*e*, and a sixth sensor 202*g*) to determine rotational motion, rotational radius, translational motion, and/or oscillatory motion of one or more components of the drive system 100 (e.g., the carrier 106). For example, the processor 204 may determine the timing of targets passage and/or gap distance sensed by the first sensor 202*a*, the third sensor 202*c*, the fifth sensor 202*e*, and the sixth sensor 202*g*. For example, the first sensor 202*a* can detect a first gap distance 402, the third sensor 202*c* can detect a third gap distance 407, the fifth sensor 202*e* can detect a fourth gap distance 409, and the sixth sensor 202 can detect a fifth gap distance 408. In such an embodiment, the processor 204 may determine rotational motion, rotational radius, translational motion, and/or oscillatory motion of one or more components (e.g., the carrier 106) of the drive system 100.

In an embodiment, the processor 204 may employ one or more data signals or data signal calculations (e.g., rotational speed, torque, rotational motion, rotational radius, translational motion, oscillatory motion, etc.) to detect and/or determine inconsistencies (e.g., degradation) of one or more components of the drive system 100. For example, the processor 204 may process the one or more data signal calculations to determine (e.g., based on the data calculations) a cause for inconsistencies (e.g., a rotational torque, a bending, a misalignment, etc.) of one or more components of the drive system 100. Additionally, the processor 204 may further compare inconsistencies between two or more components of the drive system 100, for example, inconsistencies for a plurality of posts 108.

In an embodiment, the processor 204 may compare one or more data signals or data signal calculations (e.g., rotational speed, torque, rotational motion, rotational radius, translational motion, oscillatory motion, etc.) with respect to each other. For example, the processor 204 may track and/or compare rotational oscillatory motion versus time, rotational oscillatory motion versus temperature, radial oscillatory motion versus time, radial oscillatory motion versus temperature, torque versus time, torque versus temperature, or any other suitable measurement comparison or tracking as would be appreciated by one of ordinary skill in the art upon viewing this disclosure.

In an embodiment, the processor 204 may output one or more electrical signals (e.g., a processed data signal) to the user interface 208. For example, the user interface 208 may comprise one or more electromechanical gauges for monitoring the performance and/or integrity of the drive system 100 during operation. In an additional or alternative embodiment, the processor 204 may be connected to a computer comprising monitoring and/or data processing software. In an additional or alternative embodiment, the processor 204 may be connected to a data acquisition system for data storage and/or for further processing and analysis. In an additional or alternative embodiment, the processor 204 may transmit one or more processed data signals to a remote location, for example, for monitoring the performance and/or integrity of a drive system 100 remotely. For example, the DSPMADS 200 may further comprise one or more wireless network components (e.g., a transmitter, a router, a modem, an antenna, etc.) and a wireless connection (e.g., a WiFi connection, a cellular network connection, etc.).

In an embodiment, a drive system power measuring and diagnostic system, such as DSPMADS 200, a drive system comprising a DSPMADS 200, such as the drive system 100, a method of employing such a drive system 100 and/or such a DSPMADS 200, or combination thereof may be advantageously employed to determine the torque and/or to measure the performance and integrity of one or more components of a drive system 100 and/or the drive system 100 during operation. In an embodiment, as previously disclosed, a DSPMADS 200 allows the ability to measure the performance and/or the integrity of one or more components of a drive system 100 and/or the drive system 100 without attaching sensors to moving or rotating components within the drive system 100. Additionally, conventional systems, devices, and/or methods may employ a plurality of specialized sensors (e.g., magnetic pickups, temperature probes, strain gauges, etc.) to monitor one or more parameters (e.g., ferromagnetic detection, temperature, torque, etc.). In an embodiment, the DSPMADS 200 allows multiple measurements to be performed with unified sensors (e.g., a single sensor type, for example, a plurality of VR sensors). As such, a DSPMADS may be employed to provide a means by which the performance and/or system integrity can be observed by monitoring the motion of one or more components of the drive system 200.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An apparatus comprising:

a housing;

a gearing system disposed within the housing, the gearing system comprising a plurality of first components, each first component configured to rotate about a respective longitudinal axis and a plurality of stationary components;

a plurality of targets mounted to corresponding positions on the plurality of first components, each target configured to rotate with each first component; and a plurality of sensors mounted to corresponding positions on the plurality of stationary components, wherein the sensors are configured to sense the targets as the targets rotate with the first components past the sensors, and wherein the sensors are each configured to output an electrical signal in response to sensing the targets.

2. The apparatus of claim 1, further comprising:

a processor in electrical communication with the sensors, wherein the processor is configured to perform a process on the electrical signals from the sensors; and a user interface in signal communication with the processor.

3. The apparatus of claim 2, wherein the process is selected from a group consisting of: determining output shaft torque, determining output shaft rotational speed, determining sensor temperature, determining rotating component rotational oscillatory motion, determining rotating component radial oscillatory motion, ferromagnetic debris detection, or combinations thereof.

4. The apparatus of claim 2, wherein the processes is selected from a group consisting of: determining output shaft bending, determining rotating component radius, determining rotating component temperature, or combinations thereof.

5. The apparatus of claim 2, wherein the process comprises determining output shaft torque and output shaft speed.

6. The apparatus of claim 2, wherein the process comprises sensing ferromagnetic debris.

7. The apparatus of claim 2, wherein the process comprises determining sensor temperature, and wherein the sensors are magnetic sensors.

8. The apparatus of claim 2, wherein the process comprises determining sensor temperature, and wherein the sensors are variable reluctance sensors.

9. The apparatus of claim 2, wherein the process comprises determining thermal growth of one or more gearing system components.

10. The apparatus of claim 2, wherein the process comprises determining rotational oscillation, translational oscillation, or both and wherein the process further comprises determining output shaft bending or post bending.

11. An apparatus comprising:

a housing;

a gearing system disposed within the housing and comprising:

a plurality of epicyclic gears rotating about a corresponding plurality of posts; and a plurality of targets, wherein a respective target is mounted to each post, each target configured to rotate as each post rotates;

a plurality of sensors mounted to the housing, each sensor configured to remain stationary and to sense a respective target mounted to each post as the respective target rotates past each sensor;

a processor in electrical signal communication with the sensors; and a user interface in signal communication with the processor.

12. The apparatus of claim 11, wherein the sensors are magnetic sensors.

13. The apparatus of claim 11, wherein the sensors are eddy current sensors.

14. The apparatus of claim 11, wherein the gearing system has an axis of rotation having a longitudinal length, and wherein two of the sensors are located at the same azimuthal position, but different longitudinal positions relative to the axis of rotation, and wherein two of the targets are located at the same axial position, but different longitudinal positions relative to the axis of rotation.

15. The apparatus of claim 14, wherein the epicyclic gears comprise a planetary gear, one of the targets is located on a carrier and another of the targets is located on a post.

16. The apparatus of claim 14, wherein two other of the sensors are located about 180 degrees apart from the two sensors.

17. The apparatus of claim 14, wherein two other pair of two of the sensors are located about 90 degrees apart from the two sensors.

18. The apparatus of claim 11, further comprising a fuselage and an engine, wherein the gearing system couples the engine to a plurality of rotor blades.

19. A drive system power measuring and diagnostic method comprising:

mounting a plurality of targets to a corresponding plurality of posts about which a plurality of epicyclic gears are configured to rotate, each target configured to rotate as each post rotates;

mounting a plurality of sensors at respective stationary locations;

sensing a target of the plurality of targets with a sensor of the plurality of sensors, wherein each sensor is configured to sense a respective target as the respective target rotates past each sensor, thereby producing a data signal;

processing the data signal from the plurality of sensors, thereby producing a processed data signal; and outputting the processed data signal to a user.

20. The method of claim 19, wherein providing a drive system comprising a drive system power measuring and diagnostic system further comprises configuring the drive system to develop a baseline reading from which abnormalities can be detected.

* * * * *